US011673474B2

(12) United States Patent
King et al.

(10) Patent No.: US 11,673,474 B2
(45) Date of Patent: Jun. 13, 2023

(54) CONTROLLING REGENERATIVE BRAKING TO REDUCE SKIDDING OF A VEHICLE

(71) Applicant: Textron, Inc., Providence, RI (US)

(72) Inventors: Russell William King, Evans, GA (US); Kevin Douglas Grove, McCormick, SC (US)

(73) Assignee: Textron Innovations Inc., Providence, RI (US)

( * ) Notice: Subject to any disclaimer, the term of this patent is extended or adjusted under 35 U.S.C. 154(b) by 816 days.

(21) Appl. No.: 16/731,360

(22) Filed: Dec. 31, 2019

(65) Prior Publication Data
US 2021/0197672 A1 Jul. 1, 2021

(51) Int. Cl.
| | |
|---|---|
| *H02P 3/14* | (2006.01) |
| *B60L 7/18* | (2006.01) |
| *B60L 7/14* | (2006.01) |
| *B60L 3/10* | (2006.01) |

(52) U.S. Cl.
CPC .......... *B60L 7/18* (2013.01); *B60L 7/14* (2013.01); *B60L 3/108* (2013.01); *B60L 2200/22* (2013.01); *B60L 2240/32* (2013.01); *B60L 2250/26* (2013.01); *B60T 2270/613* (2013.01)

(58) Field of Classification Search
CPC .......... B60L 7/18; B60L 7/14; B60L 2250/26; B60L 2240/429; B60L 3/108; B60L 2200/22; B60L 2220/12; B60L 2240/32; B60L 2240/423; B60L 2240/12; B60T 2270/613; Y02T 10/64
See application file for complete search history.

(56) References Cited

U.S. PATENT DOCUMENTS

| | | | |
|---|---|---|---|
| 5,642,023 | A | 6/1997 | Journey |
| 5,814,958 | A | 9/1998 | Journey |
| 5,973,175 | A | 10/1999 | Bruno |
| 6,109,009 | A | 8/2000 | Benson |
| 6,339,916 | B1 | 1/2002 | Benson |
| 6,462,506 | B2 | 10/2002 | Cochoy et al. |
| 6,686,719 | B2 | 2/2004 | Cochoy et al. |

(Continued)

OTHER PUBLICATIONS

Lampton; "How Regenerative Braking Works," https://auto.howstuffworks.com/auto-parts/brakes/brake-types/regenerative-braking.htm, Apr. 13, 2021, pp. 1-13.

*Primary Examiner* — Kawing Chan
*Assistant Examiner* — Gabriel Agared
(74) *Attorney, Agent, or Firm* — BainwoodHuang

(57) ABSTRACT

A technique controls regenerative braking to reduce skidding of a vehicle. Such a technique involves imparting rotation to an alternating current (AC) electric motor to move the vehicle to a first commanded vehicle speed; applying a regenerative braking power to the AC electric motor to bring the vehicle to a second commanded vehicle speed; while applying the regenerative braking power, adjusting the level of regenerative braking power applied to follow a predetermined speed reduction rate; while adjusting the level of regenerative braking power applied, provide a limit to the maximum level of regenerative braking power available; and while providing the limit to the maximum level of regenerative braking power available, adjusting the limit to the maximum level of regenerative braking power available based on a current speed of the vehicle.

17 Claims, 8 Drawing Sheets

(56) References Cited

U.S. PATENT DOCUMENTS

| | | | |
|---|---|---|---|
| 7,332,881 B2 | 2/2008 | Clark et al. | |
| 7,560,882 B2 | 7/2009 | Clark et al. | |
| 7,702,432 B2 * | 4/2010 | Bandai | B60T 1/10 |
| | | | 701/2 |
| 7,825,616 B2 | 11/2010 | Clark et al. | |
| 7,849,945 B2 | 12/2010 | Ross, VII et al. | |
| 8,099,936 B2 | 1/2012 | Bryant et al. | |
| 8,120,291 B2 | 2/2012 | Clark et al. | |
| 8,219,270 B2 * | 7/2012 | Lenart | B60W 10/08 |
| | | | 701/22 |
| 8,275,502 B2 * | 9/2012 | O'Connor | B60L 58/15 |
| | | | 701/22 |
| 8,630,781 B2 | 1/2014 | O'Hara et al. | |
| 8,797,773 B2 | 8/2014 | George | |
| 8,939,399 B2 | 1/2015 | Kouros et al. | |
| 10,471,831 B2 | 11/2019 | Harvey et al. | |
| 11,124,074 B2 | 9/2021 | Harvey et al. | |
| 2013/0190957 A1 * | 7/2013 | Munsell | B60K 6/52 |
| | | | 180/65.265 |
| 2015/0200613 A1 * | 7/2015 | Ota | H02P 3/18 |
| | | | 318/376 |
| 2018/0257667 A1 * | 9/2018 | Yoshii | B60W 10/18 |
| 2020/0017097 A1 * | 1/2020 | Money | B60L 7/14 |
| 2020/0304026 A1 * | 9/2020 | Mu | B60L 53/16 |

* cited by examiner

| Speed or Rotation Rate 520 | Percentage of Maximum Regenerative Power Limit 522 | Other Information 524 |
|---|---|---|
| 12.0 mph | 100% | Other Information (e.g., Induction Motor Parameters) |
| 11.5 mph | 100% | Other Information (e.g., Induction Motor Parameters) |
| 11.0 mph | 100% | Other Information (e.g., Induction Motor Parameters) |
| 10.5 mph | 90% | Other Information (e.g., Induction Motor Parameters) |
| ⋮ | ⋮ | ⋅ |
| 7.0 mph | 40% | Other Information (e.g., Induction Motor Parameters) |
| 6.5 mph | 38% | Other Information (e.g., Induction Motor Parameters) |
| ⋮ | ⋮ | ⋮ |

FIG. 7

CONTROLLING REGENERATIVE BRAKING TO REDUCE SKIDDING OF A VEHICLE

BACKGROUND

A conventional electric vehicle includes a rechargeable battery and an electric motor connected to the vehicle's drive wheels through the drivetrain. To drive the electric motor and thus move the vehicle, a vehicle operator depresses an accelerator pedal. Similarly, to slow the electric motor and provide braking to the vehicle, the vehicle operator depresses a brake pedal.

Some conventional electric vehicles perform regenerative braking when slowing the vehicle. In regenerative braking, the drive wheels turn the electric motor to convert kinetic energy of the moving vehicle into electrical energy which is stored back into the rechargeable battery for future use.

SUMMARY

It should be understood that there may be deficiencies to a conventional electric vehicle which simply performs regenerative braking when slowing the vehicle. For example, for a particular conventional electric vehicle, suppose that the electric motor is an alternating current (AC) motor which provides regenerative braking at a maximum power level when the vehicle operator partially or fully releases the accelerator pedal. In such a situation, the AC motor may provide regenerative braking torque to the drive wheels of the electric vehicle which exceeds the coefficient of friction between the drive wheels and the drive surface. As a result, the drive wheels will slip or skid on the drive surface causing an unsafe event.

Improved techniques are directed to controlling regenerative braking provided by an induction motor of a vehicle to reduce skidding (or slipping) of the vehicle. Such techniques reduce the power available from regenerative braking at lower vehicle wheel speeds. Such reduction of regenerative braking power lowers the amount of braking torque imposed by the induction motor on the drive wheels of the vehicle. Accordingly, the drive wheels are less prone to slipping or skidding on the drive surface thus improving safety of the vehicle.

One embodiment is directed to a vehicle which includes a vehicle body, a rechargeable battery supported by the vehicle body, an induction motor supported by the utility vehicle body, and control circuitry coupled with the rechargeable battery and the induction motor. The control circuitry is constructed and arranged to control regenerative braking to reduce skidding of the vehicle by:
  (A) imparting rotation to the induction motor to move the vehicle,
  (B) while the induction motor rotates at a first rate, applying a first power level limit for regenerative braking to the induction motor, and
  (C) while the induction motor rotates at a second rate, applying a second power level limit for regenerative braking to the induction motor, the second power level limit being less than the first power level limit, each of the first power level limit and the second power level limit imposing an upper limit to power available to the induction motor during regenerative braking.

Another embodiment is directed to an electronic apparatus to control regenerative braking to reduce skidding of a vehicle. The electronic apparatus includes a battery interface constructed and arranged to couple with a rechargeable battery of the vehicle, an induction motor interface constructed and arranged to couple with an induction motor of the vehicle, and control circuitry coupled with the battery interface and the induction motor interface. The control circuitry is constructed and arranged to:
  (A) impart rotation to the induction motor to move the vehicle,
  (B) while the induction motor rotates at a first rate, apply a first power level limit for regenerative braking to the induction motor, and
  (C) while the induction motor rotates at a second rate, apply a second power level limit for regenerative braking to the induction motor, the second power level limit being less than the first power level limit, each of the first power level limit and the second power level limit imposing an upper limit to power available to the induction motor during regenerative braking.

Yet another embodiment is directed to a method of controlling regenerative braking to reduce skidding of a vehicle. The method includes imparting rotation to an induction motor to move the vehicle. The method further includes, while the induction motor rotates at a first rate, applying a first power level limit for regenerative braking to the induction motor. The method further includes, while the induction motor rotates at a second rate, applying a second power level limit for regenerative braking to the induction motor. The second power level limit is less than the first power level limit. Each of the first power level limit and the second power level limit imposes an upper limit to power available to the induction motor during regenerative braking.

In some arrangements, imparting rotation to the induction motor to move the vehicle includes:
  (a) sensing that a forward/reverse switch of the vehicle is set to a forward position,
  (b) sensing operation of an accelerator pedal of the vehicle, and
  (c) in response to sensing that the forward/reverse switch is set to the forward position and sensing operation of the accelerator pedal, driving the induction motor to move the vehicle in a forward direction.

In some arrangements, applying the first power level limit for regenerative braking to the induction motor includes:
  (a) sensing that the vehicle is moving in the forward direction,
  (b) ascertaining that the induction motor is currently rotating at the first rate, and
  (c) based on the vehicle moving in the forward direction and the induction motor currently rotating at the first rate, directing the induction motor to provide braking torque that slows the vehicle in accordance with the first power level limit.

In some arrangements, applying the second power level limit for regenerative braking to the induction motor includes:
  (a) sensing that the vehicle is still moving in the forward direction,
  (b) ascertaining that the induction motor is currently rotating at the second rate, the second rate being slower than the first rate, and
  (c) based on the vehicle still moving in the forward direction and the induction motor currently rotating at the second rate, directing the induction motor to provide the braking torque that slows the vehicle in accordance with the second power level limit.

In some arrangements, directing the induction motor to provide the braking torque that slows the vehicle in accordance with the first power level limit includes imposing, as the first power level limit, a first current limit on control circuitry that controls the induction motor while regenerative braking power is absorbed from the induction motor. Additionally, directing the induction motor to provide the braking torque that slows the vehicle in accordance with the second power level limit includes imposing, as the second power level limit, a second current limit on the control circuitry that controls the induction motor while regenerative braking power is absorbed from the induction motor, the second current limit being lower than the first current limit.

In some arrangements, a maximum current limit is imposed on the induction motor to protect control circuitry that controls the induction motor. Additionally, directing the induction motor to provide the braking torque that slows the vehicle in accordance with the first power level limit includes reducing the maximum current limit by less than 10% to provide, as the first power level limit, a first current limit which is at least 90% of the maximum current limit. Furthermore, directing the induction motor to provide the braking torque that slows the vehicle in accordance with the second power level limit includes reducing the maximum current limit by at least 50% to provide, as the second power level limit, a second current limit which is less than 50% of the maximum current limit.

In some arrangements, computerized memory of the vehicle stores power limiting data. Additionally, applying the first power level limit for regenerative braking to the induction motor includes accessing the power limiting data to identify a first power level limit setting, and operating the induction motor in accordance with the first power level limit setting to provide braking torque that slows the vehicle.

In some arrangements, applying the second power level limit for regenerative braking to the induction motor includes accessing the power limiting data to identify a second power level limit setting which is different from the first power level limit setting, and operating the induction motor in accordance with the second power level limit setting to provide braking torque that slows the vehicle.

In some arrangements, the power limiting data includes a power limiting map having multiple map entries. Each map entry mapping a different induction motor rotation rate to a respective power level limit setting. Additionally, accessing the power limiting data to identify a first power level limit setting includes, based on the first rate, reading the first power level limit setting from a first map entry of the power limiting map. Furthermore, accessing the power limiting data to identify a second power level limit setting includes, based on the second rate, reading the second power level limit setting from a second map entry of the power limiting map.

In some arrangements, the method further includes, prior to imparting rotation to the induction motor to move the vehicle, loading the power limiting map having the multiple map entries into the memory, the power limiting map defining a function which correlates induction motor rotation rates to power limit percentages to adjust how much of a maximum current limit is imposed on the induction motor to protect control circuitry that controls the induction motor;

In some arrangements, applying the first power level limit and applying the second power level limit involve controlling the induction motor in a power limiting mode in which a reduced upper current limit is imposed on the induction motor in accordance with the power limiting data in place of a maximum current limit. Additionally, the method further includes receiving a service brake command in response to actuation of a service brake pedal of the vehicle and, in response to the service brake command, transitioning from controlling the induction motor in the power limiting mode to controlling the induction motor in the non-power limiting mode in which the maximum current limit is imposed on the induction motor in place of the reduced upper current limit.

In some arrangements, applying the first power level limit and applying the second power level limit involve controlling the induction motor in a power limiting mode in which a reduced upper current limit is imposed on the induction motor in accordance with the power limiting data in place of a maximum current limit. Additionally, the method further includes sensing that the forward/reverse switch is moved from the forward position to a reverse position and, in response to sensing that the forward/reverse switch is moved from the forward position to the reverse position, transitioning from controlling the induction motor in the power limiting mode to controlling the induction motor in the non-power limiting mode in which the maximum current limit is imposed on the induction motor in place of the reduced upper current limit.

In some arrangements, the vehicle is a golf car having a lithium battery. Additionally, the induction motor is an alternating current (AC) motor that drives a set of tires of the golf car using power from the lithium battery. Furthermore, the regenerative braking slows the vehicle while preventing the set of tires from skidding while the golf car moves over a surface. Also, the regenerative braking further recharges the lithium battery of the golf car.

Another embodiment is directed to a method of controlling regenerative braking to reduce skidding of a vehicle. The method includes:

(A) imparting rotation to an alternating current (AC) electric motor to move the vehicle to a first commanded vehicle speed;

(B) applying a regenerative braking power to the AC electric motor to bring the vehicle to a second commanded vehicle speed;

(C) while applying the regenerative braking power, adjusting the level of regenerative braking power applied to follow a predetermined speed reduction rate;

(D) while adjusting the level of regenerative braking power applied, provide a limit to the maximum level of regenerative braking power available; and (E) while providing the limit to the maximum level of regenerative braking power available, adjusting the limit to the maximum level of regenerative braking power available based on a current speed of the vehicle.

Other embodiments are directed to higher and lower level systems, assemblies, apparatus, processing circuits, computer program products, etc. Some embodiments are directed to various processes, electronic components and circuitry which are involved in controlling regenerative braking to reduce skidding of the vehicle.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 7 is a block diagram of an example power limiting map which is suitable for use by the utility vehicle in accordance with some example embodiments.

DETAILED DESCRIPTION

Overview

An improved technique is directed to controlling regenerative braking by an induction motor of a vehicle to reduce skidding of the vehicle. Such a technique reduces the power available from regenerative braking (i.e., using the induction motor to provide braking and to recharge a battery) at lower vehicle wheel speeds. Such limiting of regenerative braking power lowers the amount of braking torque imposed by the induction motor on the drive wheels of the vehicle. As a result, the drive wheels are less prone to slipping or skidding on the drive surface thus improving vehicle safety.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
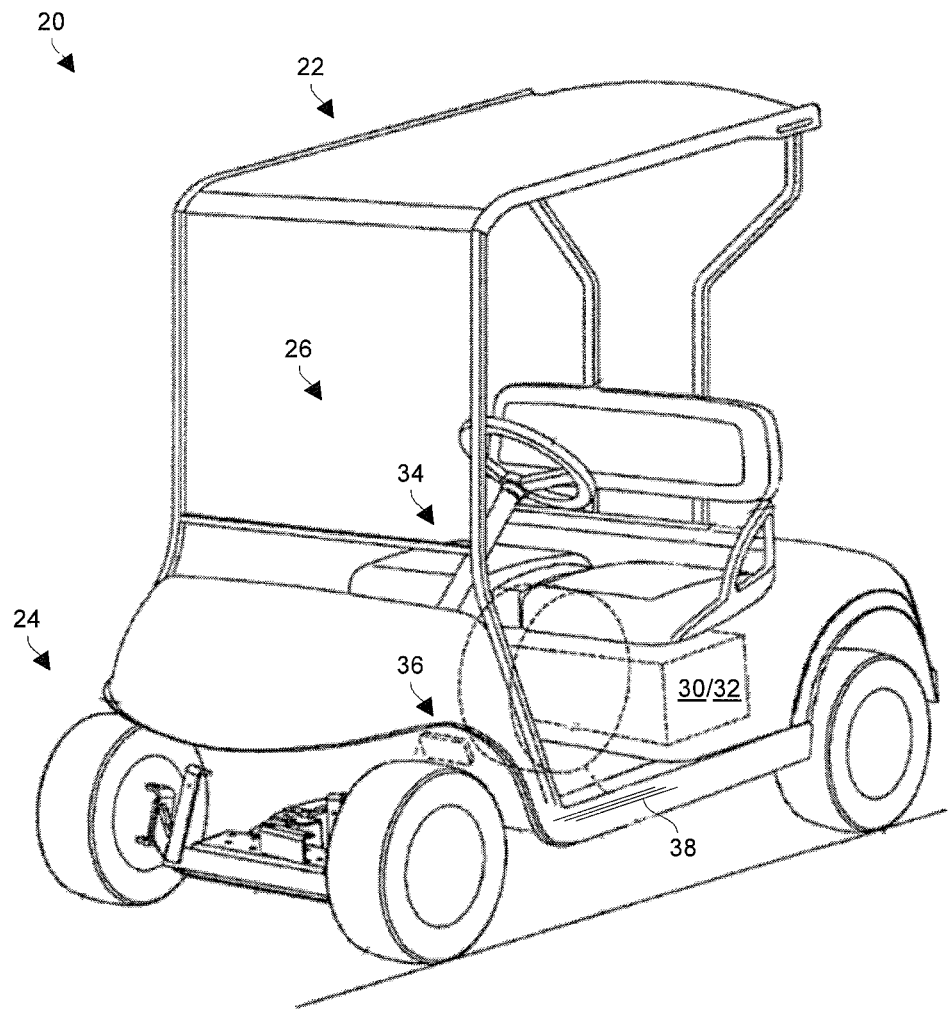
FIG. 1 is a perspective view of an example utility vehicle which controls regenerative braking to reduce skidding of the vehicle.

FIG. 1 shows an example utility vehicle 20 which controls regenerative braking to reduce skidding. The utility vehicle 20 includes a utility vehicle body 22 (e.g., a chassis, a frame, etc.), a set of tires (or wheels) 24, and a motion control system 26. It should be understood that the utility vehicle 20 has the form factor of a golf car by way of example only and that other utility vehicle form factors are suitable for use as well such as those of personal transport vehicles, food and beverage vehicles, hospitality vehicles, all-terrain vehicles (ATVs), utility task vehicles (UTVs), motorcycles, scooters, vehicles for specialized applications, as well as other lightweight vehicles and utility vehicles.

The motion control system 26 controls vehicle movement such as drive provided by the set of tires 24, speed control, braking, and so on thus enabling the utility vehicle 20 to perform useful work. The motion control system 26 of the illustrated embodiments includes, among other things, a motor system 30, a rechargeable battery system 32, and additional components 34 such as a set of user controls 36 (e.g., foot pedals, a keyed switch, a maintenance switch, etc.) and cabling 38.

It should be understood that certain components of the motor control system 26 (or portions thereof) may be disposed within a set of compartments (in one or more compartments) under a set of seats (under one or more seats) of the utility vehicle 20. For example, a compartment underneath a seat of the utility vehicle 20 may house one or more rechargeable batteries, control circuitry, cabling, controls, etc. for ease of access/serviceability, for protection against damage, for security, and so on.

It should be further understood that the motion control system 26 includes other apparatus/components as well. Along these lines, the motion control system 26 further includes a drivetrain (e.g., a set of gears, linkage, etc.) that connects the motor system 30 to the set of tires 24 (e.g., two drive wheels and two non-drive wheels), a steering wheel (or column), a steering gear set that connects the steering wheel to certain tires 24, a set of brakes, other controls and sensors, and so on.

As will be explained in further detail shortly, the utility vehicle 20 includes an induction motor which runs on electric power from a rechargeable battery and is equipped with a regenerative braking control feature which can lower regenerative braking power of the induction motor to reduce skidding of the vehicle. Further details will now be provided with reference to FIGS. 2 and 3.

Figure 2:
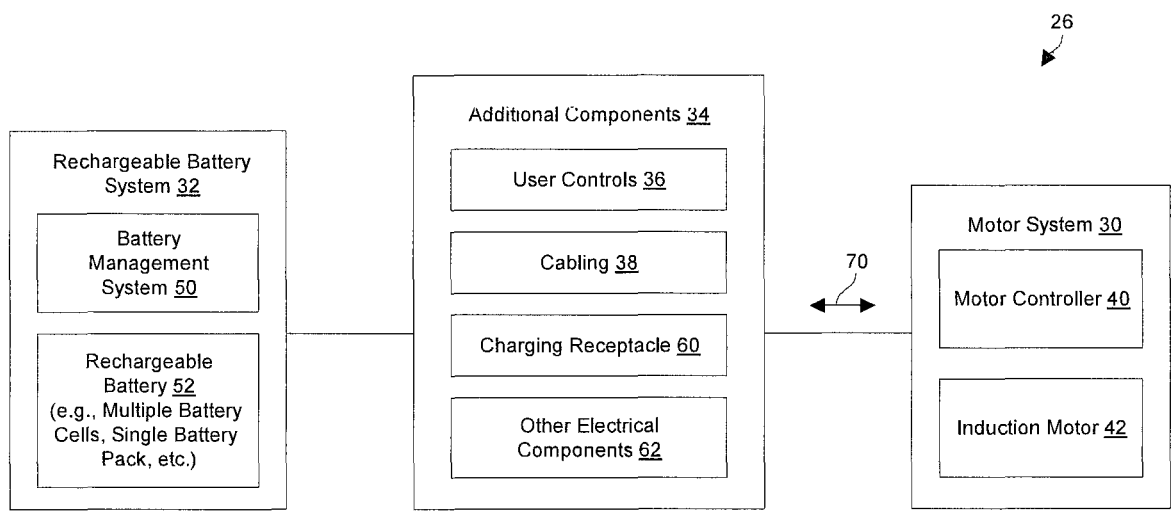
FIG. 2 is a block diagram of particular systems and components of the utility vehicle of FIG. 1 in accordance with some example embodiments.
Figure 3:
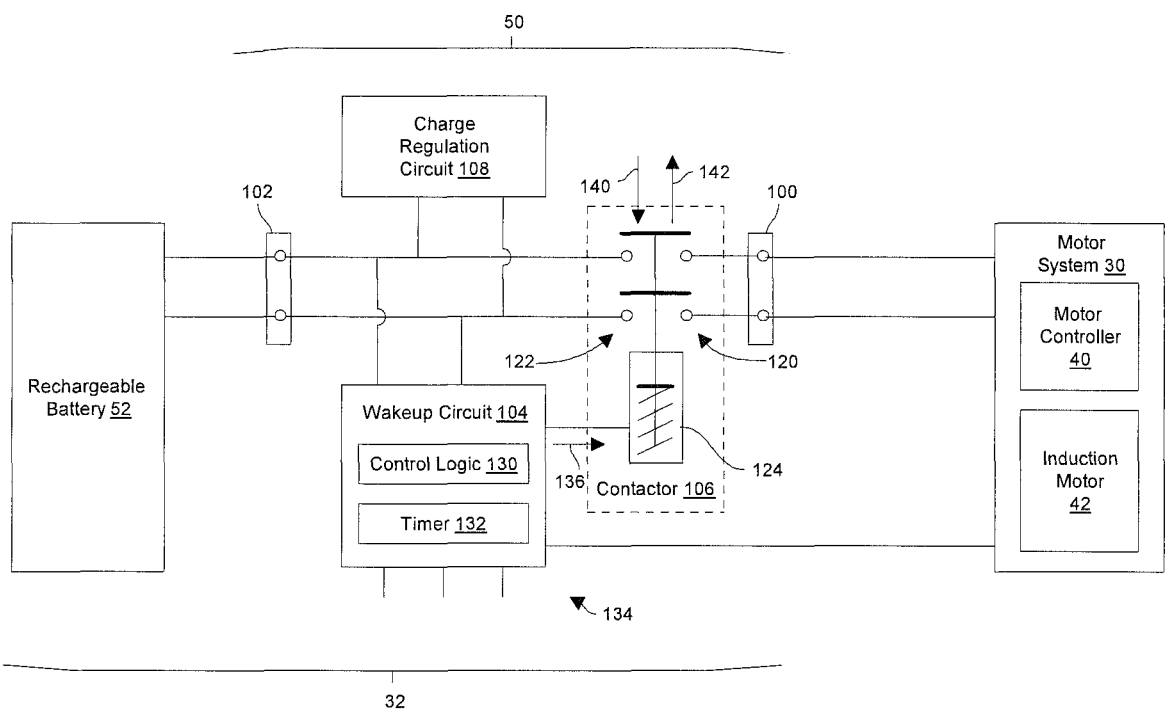
FIG. 3 is a block diagram of additional details of the utility vehicle of FIG. 1 in accordance with some example embodiments.

FIGS. 2 and 3 show particular details of the motion control system 26 of the utility vehicle 20 (FIG. 1) in accordance with certain example embodiments. FIG. 2 shows certain general components of the motion control system 26 of some embodiments and how these components are related. FIG. 3 shows particular lower level details of the motion control system 26 in accordance with some embodiments.

As shown in FIG. 2, the motor system 30 includes a motor controller 40 and an induction motor 42. The motor controller 40 controls delivery of stored electric power from the rechargeable battery system 32 to the induction motor 42 which ultimately turns at least some of the tires 24 to move the utility vehicle 20. Additionally, the motor controller 40 controls delivery of regenerative power from the induction motor 42 to recharge the rechargeable battery system 32 (e.g., during braking, while the utility vehicle 20 coasts downhill without any pedal depression, during accelerator pedal release, etc.).

In some embodiments, a safety limit (i.e., a current or power limit) is set on the controller to limit the maximum amount of current that can pass through the motor controller 40 to prevent premature wear or damage to the motor controller 40 or other electrical components. The upper limit of torque available for regenerative braking is dependent on this safety limit set on the motor controller 40.

One should appreciate that the induction motor 42 includes a stator having three phase windings, and a rotor connected to the drive wheels (also see the tires 24 in FIG. 1). The motor controller 40 operates the induction motor 42 by providing a three-phase AC current through the stator to produce a rotating magnetic field which rotates the rotor either in the forward or reverse direction. The motor controller 40 controls the rate of rotation and strength by controlling the frequency and amplitude of the AC current.

The rechargeable battery system 32 includes a battery management system (BMS) 50 and a rechargeable battery 52. The BMS 50 controls electrical access to the rechargeable battery 52. Additionally, the BMS 50 may respond to various events such as sleep events (e.g., timeouts) to prevent excessive discharging of the rechargeable battery 52 thus safeguarding the rechargeable battery 52 from becoming over discharged. The BMS 50 responds to other events as well such as wakeup events (e.g., actuation of the user controls 36), charging situations, fault conditions, and so on to properly and safely control charging and discharging of the rechargeable battery 52.

It should be understood that a variety of battery types and form factors are suitable for the rechargeable battery 52. For example, the rechargeable battery 52 may be a lithium battery which includes multiple lithium battery cells, a single battery pack, combinations thereof, and so on. As another example, the rechargeable battery 52 may utilize one or more lead acid batteries in place of, or in combination with, the lithium battery, and so on.

The additional components 34 may, for example, include the set of user controls 36 (e.g., pedals, switches, etc.), the cabling 38, a charging receptacle 60, and perhaps other electrical components (or loads) 62 (e.g., lights, a global positioning system (GPS), specialized equipment, etc.). In some arrangements, the cabling 38 includes a communications bus, such as, for example, a controller area network (CAN) bus through which the motor system 30 and the rechargeable battery system 32 exchange communications 70 such as electronic CAN messages in accordance with the CAN protocol.

As shown in FIG. 3, in accordance with some example embodiments, the battery management system (BMS) 50 of the rechargeable battery system 32 includes a power delivery interface 100, a battery interface 102, a wakeup circuit 104, a contactor 106, and a charge regulation circuit 108. These components may reside together as a single assembly or unit (e.g., within the same enclosure, within adjacent compartments, etc.) or in a distributed manner among different locations on the utility vehicle body 22 (also see FIG. 1).

The power delivery interface 100 couples with the motor system 30. Similarly, the battery interface 102 couples with the rechargeable battery 52. The wakeup circuit 104 controls closing and opening of the contactor 106 to electrically connect the motor system 30 to the rechargeable battery 52 and disconnect the motor system 30 from the rechargeable battery 52, respectively. During such operation, the charge regulation circuit 108 controls signal conditioning during discharging and charging of the rechargeable battery 52.

As further shown in FIG. 3, the contactor 106 includes a set of target contacts 120 that couple with the power delivery interface 100, a set of source contacts 122 that couple with the battery interface 102, and an electromagnetic actuator 124. Although FIG. 3 shows the contactor 106 controlling two signal paths between the motor system 30 and the lithium battery 52 by way of example (i.e., there are two source contacts 122 and two target contacts 120), other arrangements include different numbers of contacts and signal paths (e.g., one, three, four, etc.) depending on the particular application/electrical needs/etc. (e.g., DC power signals at different voltages, AC power signals in different phases, ground, etc.). The operation of the contactor 106 prevents over-discharging of the rechargeable battery 52 and is thus well suited for certain embodiments such as when the rechargeable battery 52 includes a lithium battery.

The wakeup circuit 104 includes control logic 130 and a timer 132 which operate to manage access to the rechargeable battery 52. As will be explained in further detail shortly, such operation may be based on a variety of inputs 134 from the motor system 30, from the user controls 36 (directly or indirectly), and so on. Along these lines, in response to a wakeup event (e.g., a user turning on the BMS 50), the wakeup circuit 104 outputs an actuator signal 136 that actuates the electromagnetic actuator 124 in a first direction 140 from a first position to a second position that connects respective source contacts 122 to corresponding target contacts 120 to electrically connect the motor system 30 to the rechargeable battery 52. Along these lines, the electromagnetic actuator 124 may be provisioned with a solenoid or coil that closes the contactor 106 in response to the actuator signal 136.

Additionally, in response to a sleep event (e.g., encountering a predefined time period of non-use while the BMS 50 is awake), the wakeup circuit 104 terminates output of the actuator signal 136 which releases the electromagnetic actuator 124. In particular, the electromagnetic actuator 124 is spring biased in a second direction 142 which is opposite the first direction 140. Accordingly, termination of the actuator signal 136 enables the electromagnetic actuator 124 to return back from the second position to the first position thus automatically separating the source contacts 122 from the target contacts 120 when the wakeup circuit 104 terminates output of the actuation signal 136 thus disconnecting the motor system 30 from the rechargeable battery 52. As a result, there are no parasitic loads placed on the rechargeable battery 52 that could otherwise further discharge the rechargeable battery 52 to an over-depleted state.

In other embodiments, the wakeup circuit 104 does not need to constantly maintain the actuator signal 136. Instead, the wakeup circuit 104 controls engagement and disengagement of the contactor 106 using discrete engagement and disengagement signals. With such use of a dedicated release signal, maintenance of a signal and termination for release is not required. A utility vehicle having a similar wakeup/sleep feature is described in U.S. Pat. No. 10,322,688 having a filing date of Dec. 30, 2016, and having "CONTROLLING ELECTRICAL ACCESS TO A LITHIUM BATTERY ON A UTILITY VEHICLE" as a title, the contents and teachings of which are herein incorporated by reference in their entirety.

Furthermore, in some embodiments, other conductive pathways exist between the vehicle's power supply (e.g., the rechargeable battery 52) and the motor system 30 that do not extend through the contactor 106. Moreover, in some embodiments, such as lead acid battery powered vehicles, the motor system 30 may connect directly to a set of lead acid batteries (e.g., where there is no over-discharge protection by a contactor 106).

Regenerative Braking Control

Figure 4:
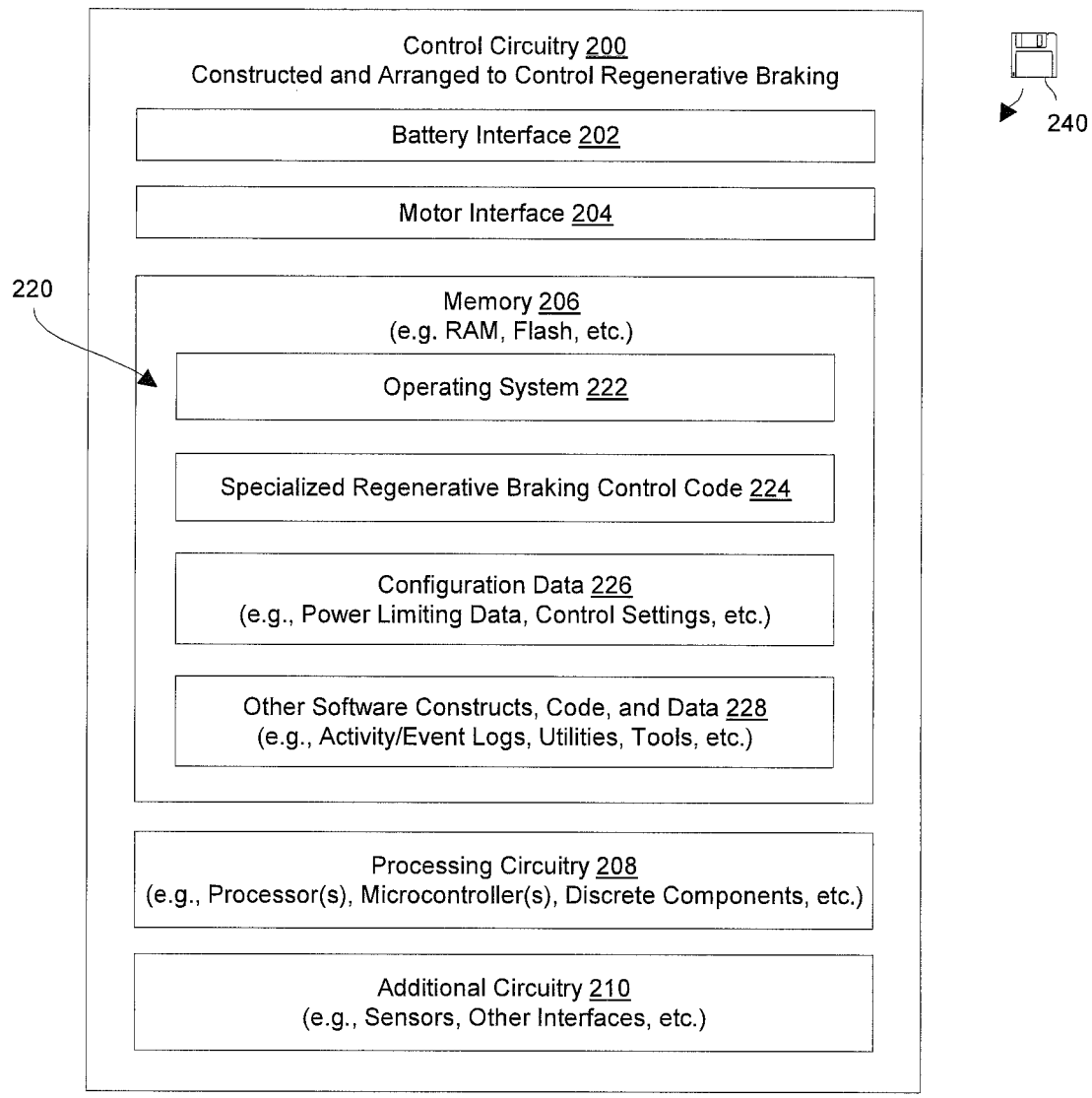
FIG. 4 is a block diagram of particular details of control circuitry of the utility vehicle of FIG. 1 in accordance with some example embodiments.

FIG. 4 shows particular details of control circuitry 200 that controls regenerative braking to reduce skidding of a vehicle. The control circuitry 200 includes, in an example embodiment, a battery interface 202, a motor interface 204, memory 206, processing circuitry 208, and additional circuitry 210.

In accordance with certain embodiments, the control circuitry 200 may form at least a portion of the motor controller 40 or may be separate from the motor controller 40 (also see FIGS. 2 and 3). Additionally or alternatively, the control circuitry 200 may form at least a portion of the battery management system 50 or may be separate from the battery management system 50 (also see FIGS. 2 and 3).

The battery interface 202 is constructed and arranged to connect the control circuitry 200 to the rechargeable battery 52 of the rechargeable battery system 32. In accordance with some embodiments, the battery interface 202 connects to the rechargeable battery 52 through the contactor 106 (e.g., when the rechargeable battery 52 includes a set of lithium batteries). In accordance with other embodiments, the battery interface 202 connects directly to the rechargeable battery 52 (e.g., when the rechargeable battery 52 includes only a set of lead acid batteries).

The motor interface 204 is constructed and arranged to connect the control circuitry 200 to the induction motor 42 of the motor system 30. In accordance with some embodiments, the number of conductors within the motor interface 204 depends on the number of poles (i.e., the number of sets of three-way electromagnetic windings) in the induction motor 42 (e.g., a 2-pole AC motor, a 4-pole AC motor, a 6-pole AC motor, etc.).

The memory 206 stores a variety of memory constructs 220 including an operating system 222, specialized regenerative braking control code 224, configuration data 226 (e.g., power limiting data, control settings, etc.), and other software constructs, code and data 228 (e.g., activity/event logs, utilities, tools, etc.). Although the memory 206 is illustrated as a single block in FIG. 4, the memory 206 is intended to represent both volatile and non-volatile storage (e.g., random access memory, flash memory, magnetic memory, etc.), and may, in some embodiments, include a plurality of discrete physical memory units.

The processing circuitry 208 is configured to run in accordance with instructions of the various memory constructs 220 stored in the memory 206. In particular, the processing circuitry 208 runs the operating system 222 to manage various computerized resources (e.g., processor cycles, memory allocation, etc.). Additionally, the processing circuitry 208 runs the specialized regenerative braking control code 224 to electronically control regenerative braking power. The processing circuitry 66 may be implemented in a variety of ways including via one or more processors (or cores) running specialized software, application specific ICs (ASICs), field programmable gate arrays (FPGAs) and associated programs, microcontrollers, discrete components, analog circuits, other hardware circuitry, combinations thereof, and so on. In the context of one or more processors executing software, a computer program product 240 is capable of delivering all or portions of the software to the control circuitry 200 (e.g., also see the memory constructs 220 in FIG. 4). The computer program product 240 has a non-transitory (or non-volatile) computer readable medium which stores a set of instructions which controls one or more operations of the control circuitry 200. Examples of suitable computer readable storage media include tangible articles of manufacture and other apparatus which store instructions in a non-volatile manner such as flash memory, a magnetic storage medium (e.g., various disk memories such as a hard drive, floppy disk, or other magnetic storage medium), tape memory, optical disk (e.g., CD-ROM, DVD, Blu-Ray, or the like), and the like. It will be appreciated that various combinations of such computer readable storage media may be used to provide the computer readable medium of the computer program product 240 in some embodiments.

The additional circuitry 210 represents other circuitry of the control circuitry 200. Such circuitry may include sensors, other interfaces, connectors, and so on. In some arrangements, where the utility vehicle is specialized equipment (e.g., a food and beverage vehicle, an ATV, etc.) the additional circuitry 208 may represent other components such as an electronic thermostat, lighting control, and so on.

Figure 5:
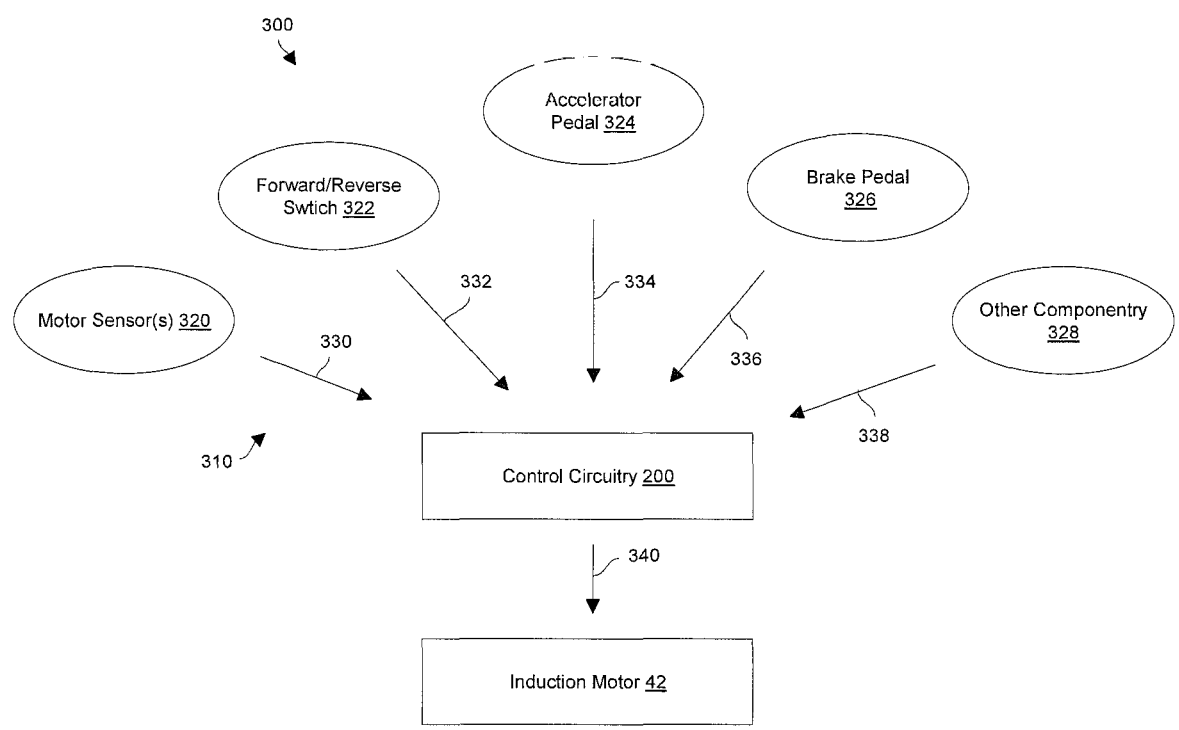
FIG. 5 is a general diagram illustrating input to and output from the control circuitry of FIG. 4 in accordance with some example embodiments.

FIG. 5 diagrammatically shows various vehicle componentry 300 that provides input 310 (e.g., electric signals, bus messages, etc.) to the control circuitry 200 for regenerative braking control. The vehicle componentry 300 includes motor sensor(s) 320, a forward/reverse switch 322, an accelerator pedal 324, a brake pedal 326, and other componentry 328.

The motor sensor(s) 320 provide motor sensor information 330 to the control circuitry 200. Such sensor information 330 enables the control circuitry 200 to determine the current rate of rotation of the induction motor 42 and thus the current speed of the utility vehicle 20 since the induction motor 42 connects to the drive wheels 24 of the utility vehicle 20.

The forward/reverse switch 322 provides a switch direction signal 332 to the control circuitry 200. The switch direction signal 332 identifies the current position of the forward/reverse switch 332 which is controlled by the vehicle operator (e.g., forward position, reverse position, neutral position, etc.).

The accelerator pedal 324 provides an accelerator pedal signal 334 to the control circuitry 200. The accelerator pedal signal 334 identifies the current position of the accelerator pedal 324 which is controlled by the vehicle operator (e.g., a current angle of displacement, fully depressed, fully released, etc.).

The service brake pedal 326 provides a brake pedal signal 336 to the control circuitry 200. The brake pedal signal 336 identifies the current position of the brake pedal 326 which is controlled by the vehicle operator (e.g., a current angle of displacement, fully depressed, fully released, etc.).

The other componentry 328 provides other signals 338 to the control circuitry 200. For example, the other signals 338 may indicate whether a tow switch of the utility vehicle 20 has been set to enabling vehicle towing, whether the utility vehicle 20 is currently connected to an external charger to charge the rechargeable battery 52, whether an operator has inserted a key into a keyed switch of the utility vehicle 20 and turned the keyed switch, whether a certain fault has occurred, and so on.

During operation and based on the input 310 from the vehicle componentry 300, the control circuitry 200 determines how to operate the induction motor 42 and outputs appropriate induction motor control input 340 to the induction motor 42. The induction motor 42 responds by rotating, providing generative braking, etc.

In accordance with certain embodiments, the utility vehicle 20 performs regenerative braking in two different regenerative braking modes. In one regenerative braking mode hereinafter referred to as "a non-limiting regenerative braking mode", the control circuitry 200 of the utility vehicle 20 imposes regenerative braking based on the current wheel speed and the commanded speed. In various embodiments, the current wheel speed is sensed as motor speed (e.g. the motor always spins with the wheels at a fixed ratio) and the commanded speed is sensed through accelerator pedal position (e.g. percentage of accelerator pedal actuation commands the same percentage of the maximum programmed vehicle wheel speed limit). The control circuitry 200 compares the current wheel speed with the commanded speed and adjusts regenerative braking power (e.g. torque, current) to bring the current wheel speed to the commanded speed at a predetermined deceleration rate (e.g.

to reduce the current wheel speed from 10 mph to a commanded 5 mph at the predetermined rate of −5 mph per second).

In some embodiments, the control circuitry 200 uses a closed feedback loop to measure the current wheel speed to adjust the regenerative braking power to maintain the desired deceleration rate. For example, the control circuitry 200 initially applies a first percentage of the braking power, but outside factors (e.g. downhill slope or heavier vehicle) may prevent the wheel speed from slowing at the desired rate and the control circuitry 200 applies a second percentage of braking power that is higher than the first. In this mode the full percentage of the regenerative braking power limit is available to the control circuitry 200 regardless of the current wheel speed of the utility vehicle 20.

In some embodiments, in another regenerative braking mode hereinafter referred to as "a power-limiting regenerative braking mode", the control circuitry 200 of the utility vehicle 20 operates the similarly to the non-limiting regenerative braking mode, but limits the regenerative braking power available based on the current wheel speed (e.g., motor speed) of the utility vehicle 20.

The power-limiting regenerative braking mode is well suited for when the vehicle operator partially or fully releases the accelerator pedal 324 of the utility vehicle 20 while the utility vehicle 20 is moving in the forward direction. In such a situation, the control circuitry 200 controls regenerative braking power based on a power limiting function. Here, the control circuitry 200 directs the induction motor 42 to provide regenerative braking where the regenerative braking power limit is based on the current wheel speed of the utility vehicle 20 which may be determined by the rotation speed of the induction motor 42 (e.g., see the motor sensors 320 which provide the motor sensor information 330). In accordance with certain embodiments, the regenerative braking power is greatly limited at lower vehicle wheel speeds but sharply increases at higher vehicle wheel speeds.

For example, suppose that the vehicle operator wishes to drive the utility vehicle 20 in the forward direction by depressing the accelerator pedal 324. In this situation, the control circuitry 200 confirms that the forward/reverse switch 322 is in the forward position based on the switch direction signal 332. Additionally, the control circuitry 200 senses that the operator has depressed the accelerator pedal 324 based on the accelerator pedal signal 334 and that the operator has not depressed the brake pedal 326 based on the brake pedal signal 336. Furthermore, the control circuitry 200 analyzes the other signals 338 from the other componentry to verify that it is safe to drive the induction motor 42.

Accordingly, the control circuitry 200 provides induction motor control input 340 to the induction motor 42 to operate the induction motor 42. In particular, using electric power from the rechargeable battery 52, the control circuitry 200 provides a three-phase AC current to the induction motor 42 turn the rotor of the induction motor 310 in the forward direction and thus rotate the drive wheels 24 of the utility vehicle 20 in the forward direction to move the utility vehicle 20 forward. The control circuitry 200 controls current speed of the utility vehicle 20 by continuing to sense the input 310 from the vehicle componentry 300 and outputting the three-phase AC current at an appropriate frequency and amplitude, i.e., the induction motor control input 340.

Now, suppose that the vehicle operator partially or fully releases the accelerator pedal 324 while the utility vehicle 20 moves in the forward direction. In this situation, the control circuitry 200 confirms that the forward/reverse switch 322 is still in the forward position based on the switch direction signal 332. Additionally, the control circuitry 200 senses that the operator has at least partially released the accelerator pedal 324 based on the accelerator pedal signal 334 and that the operating has not depressed the brake pedal 326 based on the brake pedal signal 336. Furthermore, the control circuitry 200 analyzes the other signals 338 from the other componentry to verify that it is safe to operate the induction motor 42 in a regenerative braking mode in which the induction motor 42 generates electrical energy from kinetic energy of the moving utility vehicle 20.

To this end, the control circuitry 200 provides induction motor control input 340 to the induction motor 310 to provide regenerative braking which slows the utility vehicle 20 and recharges the rechargeable battery 52. In particular, the control circuitry 200 fashions the frequency and amplitude of the three-phase AC current based on power limiting data (e.g., see the configuration data 226 in FIG. 4) to provide an appropriate braking torque that reduces tire skidding. At and below the power limit, the regenerative braking torque that the induction motor 42 provides to the drive wheels 24 of the utility vehicle 20 is less than the coefficient of friction between the drive wheels 24 and the drive surface. As a result, the drive wheels 24 are less prone to slipping and skidding thus improving safety of the vehicle 20.

In accordance with certain embodiments, the power-limiting regenerative braking mode is only active when the utility vehicle 20 is moving in the forward direction. Otherwise, the power-limiting regenerative braking mode is inactive (i.e., de-activated). Such forward direction determination may be made from the input 310 (e.g., the motor sensor information 330, the switch direction signal 332, other input, combinations thereof, etc.).

Additionally, in accordance with certain embodiments, the power-limiting regenerative braking mode is only active when the brake pedal signal 336 indicates that the service brake pedal 326 is not currently depressed. Otherwise, the power-limiting regenerative braking mode is inactive (i.e., de-activated). In some arrangements, the service brake pedal 326 provides a constant brake pedal signal 336 indicating the current status of the brake pedal 326. In other arrangements, the service brake pedal 326 provides, as the brake pedal signal 336, a service brake command whenever the brake pedal 326 is depressed and the absence of the service brake command indicates that the brake pedal 326 is not depressed.

Power Limiting Function

Figure 6:
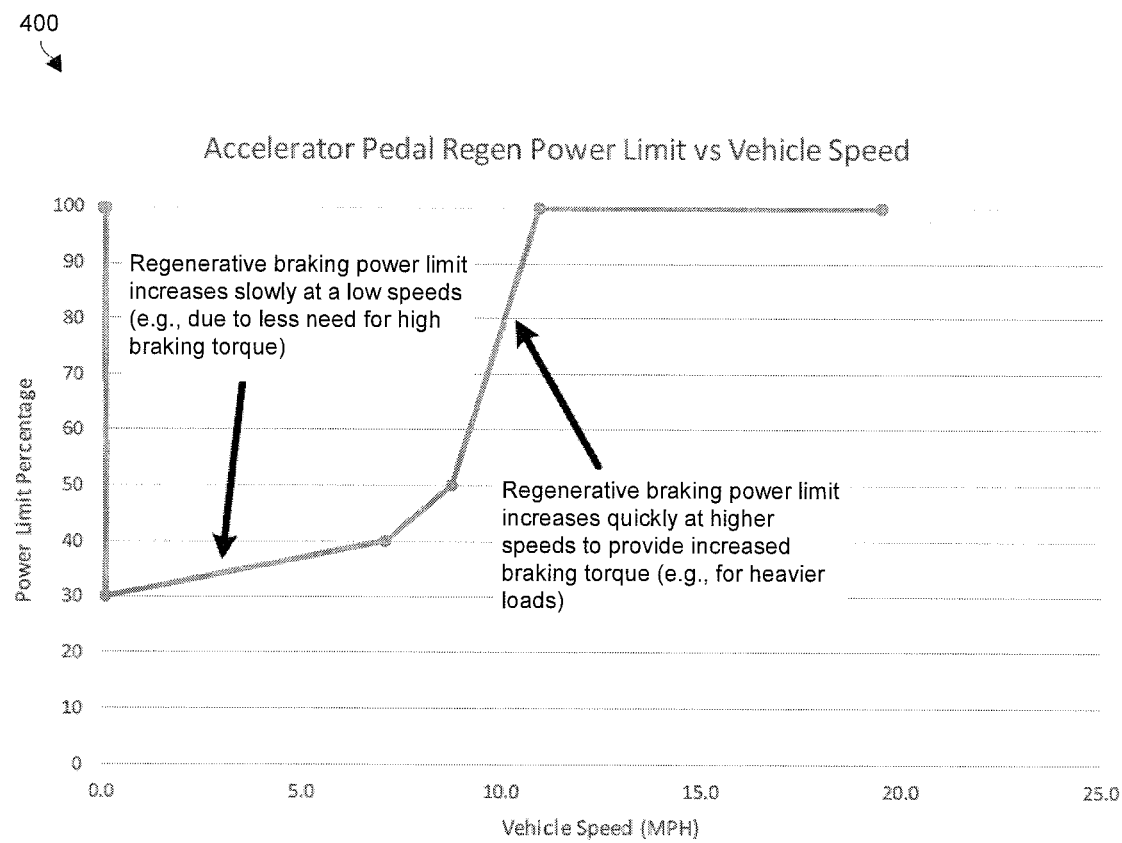
FIG. 6 is a block diagram of an example power limiting function imposed by the control circuitry of the utility vehicle in accordance with some example embodiments.

FIG. 6 shows a graph of an example power limiting function (or curve) 400 that is provided by the control circuitry 200 of the utility vehicle 20 (also see FIG. 4). The example power limiting function 400 is a plot of vehicle speed (e.g. speed of the vehicle wheels) vs. power limit percentage.

It should be understood that the particular values (or coordinates) for the power limiting function 400 of FIG. 6 are by way of example only and that, in other arrangements, the values are different and may be based on a variety of factors. Such factors may include the maximum speed for the utility vehicle 20, the types of treads on the tires 24, tire diameter, motor size, drive ratio, the type of terrain and/or environment, the vehicle's weight, the vehicle's application, and so on. In some embodiments the power limiting map of a utility vehicle 20 can be modified when these factors change. For example, the operator could select various inputs based on the operating condition that day or for a particular activity (e.g. tire size change, surface condition change, fully loaded vehicle, or any other non-standard operation condition).

It should be further understood that the example power limiting function 400 depicts utility vehicle speed (e.g. speed of the wheels of the utility vehicle). However, in some arrangements, the speed of the utility vehicle wheels is measured or based on the rate of rotation of the induction motor 42 (i.e., the rate at which the rotor spins relative to the stator). Accordingly, the power limiting function 400 may be also presented as a function of induction motor rotation rate vs. power limit percentage.

As shown in FIG. 6, the control circuitry 200 provides 100% regenerative braking power limit at a utility vehicle speed of 11 miles per hour (mph) or higher. In some embodiments, if the control circuitry 200 imposes regenerative braking while the utility vehicle speed is moving in this speed range, the control circuitry 200 allows the rechargeable battery 52 to absorb up to 100% of the maximum available power generated by the induction motor 42 and thus provide maximum braking torque.

As further shown in FIG. 6, the control circuitry 200 decrease the amount of regenerative braking power available once the utility vehicle speed is below 11 mph. For example, at 10 mph, the control circuitry 200 imposes regenerative braking limit at 80% of the maximum available power generated by the induction motor 42. Additionally, at 9 mph, the control circuitry 200 imposes regenerative braking limit at 50% of the maximum available power generated by the induction motor 42. Furthermore, at 7 mph, the control circuitry 200 imposes regenerative braking at 40%, and so on. Also, by way of example, the maximum braking power limit imposed by the control circuitry 200 is 30% when the utility vehicle speed is near 0 mph.

Due to such limiting of regenerative braking power at lower utility vehicle speeds, regenerative braking torque applied to the drive wheels 24 is weaker at the lower utility vehicle speeds. Accordingly, the drive wheels 24 are allowed to rotate more freely and the regenerative braking torque remains less than the coefficient of friction between the drive wheels 24 and the drive surface. As a result, the drive wheels 24 are less prone to slipping and skidding thus improving vehicle safety.

FIG. 7 shows an example power limiting map 500 for implementing the example power limiting function 400 of FIG. 6. The example power limiting map 500 includes a series of map entries 510(1), 510(2), 510(3), 510(4), . . . 510(n), 510(n–1), . . . (collectively, map entries 510). The map entries 510 of the example power limiting map 500 may be predefined and accessible from computer readable memory. Along these lines, the example power limiting map 500 may be preprogrammed, e.g., stored as a file or lookup table in memory (also see the configuration data 226 in FIG. 4).

The map entries 510 map utility vehicle speeds or alternatively induction motor rotation rates to respective power level settings. Along these lines, each map entry 510 includes a speed (or rotation rate) field 520 to store speed data, a percentage of regenerative power field 522 to store power level data, and other fields 524 to store other information such as induction motor operating parameters, etc.

For example, the map entry 510(1) maps a utility vehicle speed of 12.0 mph to 100% of the maximum regenerative braking power. Additionally, the map entry 510(n) maps a utility vehicle speed of 7.0 mph to 40% of the maximum regenerative braking power, the map entry 510(n–1) maps a utility vehicle speed of 6.5 mph to 38% of the maximum regenerative braking power, and so on.

On should appreciate that higher precision and finer granularity for different coordinates may be achieved by increasing the number of map entries 510 that cover the same range of speeds or rotation rates. Furthermore, more map entries 510 can be added to cover a wider operating range, etc.

It should be understood that the example power limiting map 500 was provided for a particular utility vehicle application such as a golf car on a golf course. Such an application may be characterized with a particular set of vehicle weights, tire treads, drive surfaces, and so on. Other applications may have different characteristics and thus a different power limiting map 500 (e.g., a baggage cart, manufacturing equipment, an inventory moving vehicle, etc.).

In some embodiments, the control circuitry 200 of the utility vehicle 20 may be able to perform a variety of different operations, or operate in a variety of different environments/settings. Accordingly, the control circuitry 200 may be preloaded with multiple power limiting maps 500 that are selectable by a user.

In some embodiments, a power limiting map 500 may be derived during utility vehicle use. For example, the control circuitry 200 may derive the power limiting map 500 dynamically, on the fly, in real time, over the course of use via artificial intelligence, etc.

Furthermore, it should be understood that alternatives exist for the power limiting function 400 defined by the power limiting map 500. For example, the map entries 510 may define different operating ranges rather than specific speeds (or rates) for respective percentages of regenerative braking power. Additionally, the control circuitry 200 may use a set of rules, policies, functions, and/or algorithms in addition to or in place of the power limiting map 500 to provide the power limiting function 400. Other implementations are suitable for use as well.

Further Details

Figure 8:
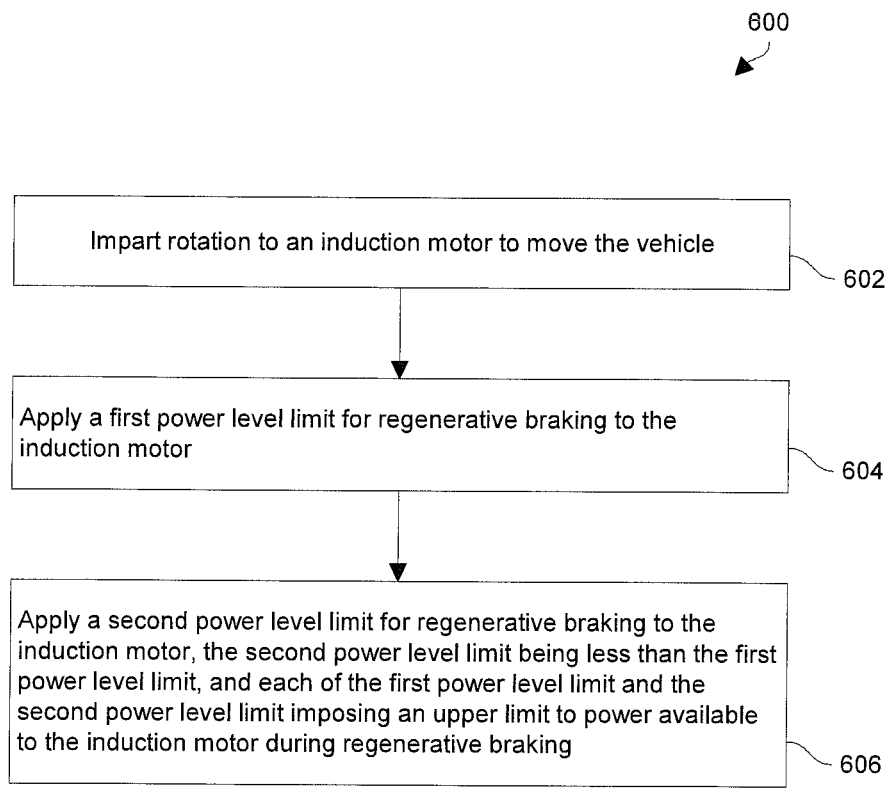
FIG. 8 is a flowchart of a procedure which is performed by the utility vehicle in accordance with some example embodiments.

FIG. 8 is a flowchart of a procedure 600 which is performed by a vehicle to reduce skidding of the vehicle in accordance with some example embodiments. In particular, control circuitry of the vehicle performs the procedure 600 to control regenerative braking.

At 602, the control circuitry imparts rotation to an induction motor of the vehicle to move the vehicle. Along these lines, the control circuitry may sense that the forward/reverse switch is set to a forward position, sense depression of the accelerator pedal, and in response drive the induction motor to move the vehicle in the forward direction.

At 604, while the induction motor rotates at a first rate (or while the vehicle is moving in the forward direction at a first speed), the control circuitry applies a first power level limit for regenerative braking to the induction motor. In particular, the control circuitry has access to a set of sensors to determine the current rotation rate of the induction motor and directs the induction motor to provide a first amount of braking torque in accordance with the first power level limit.

At 606, while the induction motor rotates at a second rate (or while the vehicle is moving in the forward direction at a second speed), the control circuitry applies a second power level limit for regenerative braking to the induction motor, the second power level limit being less than the first power level limit. Each of the first power level limit and the second power level limit imposing an upper limit to power available to the induction motor during regenerative braking. Such operation reduces the possibility of the tires slipping or skidding. Accordingly, the operator is able to maintain robust and reliable control of the vehicle.

As described above, improved techniques are directed to controlling regenerative braking by an induction motor 42 of a vehicle 20 to reduce skidding of the vehicle 20. Such techniques reduce the power available from regenerative braking at lower vehicle wheel speeds. Such reduction of regenerative braking power lowers the amount of braking torque imposed by the induction motor 42 on the drive wheels 24 of the vehicle 20. Accordingly, the drive wheels 24 are less prone to slipping or skidding on the drive surface thus improving safety of the vehicle 20.

While various embodiments of the present disclosure have been particularly shown and described, it will be understood by those skilled in the art that various changes in form and details may be made therein without departing from the spirit and scope of the present disclosure as defined by the appended claims.

In accordance with certain embodiments, the utility vehicle employs an AC electrical architecture of an AC-powered electric vehicle. In particular, the utility vehicle operates the AC drive system to provide regenerative braking in response to a throttle command from the accelerator pedal and a brake command from the service brake pedal.

In accordance with certain embodiments, a regenerative braking power limiting map is employed in the AC drive controller that is a function of motor rpm (rotations per minute). The shape of the power limiting map is such that the regenerative braking power at low motor rpm is greatly reduced. This regenerative braking power limiting at low rpm has the effect of greatly reducing the amount of braking torque at the drive wheels during a regenerative braking event. By reducing braking torque at low rpm, the likelihood of the drive wheels braking traction is reduced. By further increasing sharply the available regenerative braking power as the motor rpm increases, speed control is achieved at a vehicle speed such that the drive wheels are rotating fast enough to allow for vehicle control. Along these lines, drive wheels at higher rpm, even if slipping relative to ground speed, tend to stay in track as opposed to "fish tailing" or "sideways sliding".

In some arrangements, the regenerative braking power limiting map is active only at a very specific set of conditions during vehicle operation. The power limiting is only active when the vehicle is being operated in the forward direction. During vehicle operation in the forward direction, and only when there is not a service brake command from the vehicle operator, the power limiting takes affect when the speed command to the controller from the accelerator pedal is less than the actual vehicle speed. At this point, as regenerative braking is applied, the power limiting of the regenerative braking will follow the power limiting map.

In the reverse direction, the power limiting is not active. This is to ensure full regenerative braking capability for anti-rollback and position holding functions. Additionally, the power limiting is not active when there is a braking command to the AC drive controller from a service brake pedal input from the vehicle operator. This ensures full braking power available for braking as commanded by the vehicle operator.

Conventional electric vehicles that employ vehicle drive systems that are based on DC separately excited motors have different regenerative braking characteristics as compared to AC drive systems. In DC systems where the controller power section is a "quarter bridge" configuration, there is a natural tendency for the regenerative braking torque to reduce as the motor rpm falls below the "base speed" of the DC motor. For these systems, a power limiting mapping function as described above may not be needed because the DC system may naturally limit power as the motor rpm falls due to the physical characteristics of the system.

In accordance with certain embodiments, particular improvements disclosed herein are employed on any specialized vehicle that has an AC powered drive system. Such improvements are not specific to battery type or AC motor technology type. Such improvements are suitable for us in any industry that employs a vehicle with an AC powered drive system.

As describe above, certain improved techniques involve reduction of tire skidding on AC drive systems utilizing regenerative braking. Such techniques generally relate to the field of electric vehicle drive systems and specifically to traction control.

It should be appreciated that the improvements disclosed herein were described in the context of induction motors by way of example. Other types of synchronous and asynchronous motor technologies are suitable for use as well such as permanent magnet AC, brushless DC, switched reluctance, other synchronous and/or asynchronous systems, and so on.

It should be further appreciated that in accordance with certain embodiments, without a power limiting map, the motor controller has a current limit (or power limit) that controls the amount of current that can pass through it and that the current limit corresponds to a braking torque. This is a safety limit on the motor controller to prevent damage to the controller. The actual regenerative braking power used is based off of current wheel speed difference to the commanded wheel speed (e.g., the controller senses that the current speed is 10 mph but should be 5 mph) and then aims to slow the wheels at a predetermined rate. The controller is on a feedback loop and adjusts the braking power to try and maintain that rate (if the vehicle is not slowing down fast enough it will increase the braking power up to the 100% limit if necessary). Accordingly, the power available is limited and not necessarily the actual power used.

One should further appreciate that certain improved techniques are applicable to vehicles other than strictly land-based vehicles such as aircraft (e.g., during landing), watercraft (e.g., when on land), etc. Such modifications and enhancements are intended to belong to various embodiments of the disclosure.

What is claimed is:

1. A method of controlling regenerative braking to reduce skidding of a vehicle, the method comprising:
    imparting rotation to an induction motor to move the vehicle;
    while the induction motor rotates at a first rate, applying a first power level limit for regenerative braking to the induction motor; and
    while the induction motor rotates at a second rate, applying a second power level limit for regenerative braking to the induction motor, the second power level limit being less than the first power level limit, each of the first power level limit and the second power level limit imposing an upper limit to power available to the induction motor during regenerative braking;
    wherein imparting rotation to the induction motor to move the vehicle includes:
        sensing that a forward/reverse switch of the vehicle is set to a forward position,
        sensing operation of an accelerator pedal of the vehicle, and in response to sensing that the forward/reverse switch is set to the forward position and sensing operation of the accelerator pedal, driving the induction motor to move the vehicle in a forward direction;

wherein applying the first power level limit for regenerative braking to the induction motor includes:
sensing that the vehicle is moving in the forward direction,
ascertaining that the induction motor is currently rotating at the first rate, and
based on the vehicle moving in the forward direction and the induction motor currently rotating at the first rate, directing the induction motor to provide braking torque that slows the vehicle in accordance with the first power level limit.

2. A method as in claim 1, further comprising:
while the induction motor rotates at the first rate, sensing a position of an acceleration pedal of the vehicle, the position directing the induction motor to rotate at a rate that is less than both the first rate and the second rate;
wherein applying the first power level limit is in response to sensing the position of the accelerator pedal and includes:
directing the induction motor to apply a first braking torque that slows the rotation of the induction motor to the second rate in accordance with the first power level limit;
wherein applying the second power level limit includes:
directing the induction motor to apply a second braking torque that slows the rotation of the induction motor in accordance with the second power level limit.

3. A method as in claim 1 wherein applying the second power level limit for regenerative braking to the induction motor includes:
sensing that the vehicle is still moving in the forward direction,
ascertaining that the induction motor is currently rotating at the second rate, the second rate being slower than the first rate, and
based on the vehicle still moving in the forward direction and the induction motor currently rotating at the second rate, directing the induction motor to provide the braking torque that slows the vehicle in accordance with the second power level limit.

4. A method as in claim 3 wherein directing the induction motor to provide the braking torque that slows the vehicle in accordance with the first power level limit includes:
imposing, as the first power level limit, a first current limit on control circuitry that controls the induction motor while regenerative braking power is absorbed from the induction motor; and
wherein directing the induction motor to provide the braking torque that slows the vehicle in accordance with the second power level limit includes:
imposing, as the second power level limit, a second current limit on the control circuitry that controls the induction motor while regenerative braking power is absorbed from the induction motor, the second current limit being lower than the first current limit.

5. A method as in claim 3 wherein a maximum current limit is imposed on the induction motor to protect control circuitry that controls the induction motor;
wherein directing the induction motor to provide the braking torque that slows the vehicle in accordance with the first power level limit includes:
reducing the maximum current limit by less than 10% to provide, as the first power level limit, a first current limit which is at least 90% of the maximum current limit; and
wherein directing the induction motor to provide the braking torque that slows the vehicle in accordance with the second power level limit includes:
reducing the maximum current limit by at least 50% to provide, as the second power level limit, a second current limit which is less than 50% of the maximum current limit.

6. A method as in claim 1 wherein computerized memory of the vehicle stores power limiting data; and
wherein applying the first power level limit for regenerative braking to the induction motor includes:
accessing the power limiting data to identify a first power level limit setting, and
operating the induction motor in accordance with the first power level limit setting to provide braking torque that slows the vehicle.

7. A method as in claim 6 wherein applying the second power level limit for regenerative braking to the induction motor includes:
accessing the power limiting data to identify a second power level limit setting which is different from the first power level limit setting, and
operating the induction motor in accordance with the second power level limit setting to provide braking torque that slows the vehicle.

8. A method as in claim 7 wherein the power limiting data includes a power limiting map having multiple map entries, each map entry mapping a different induction motor rotation rate to a respective power level limit setting;
wherein accessing the power limiting data to identify a first power level limit setting includes:
based on the first rate, reading the first power level limit setting from a first map entry of the power limiting map; and
wherein accessing the power limiting data to identify a second power level limit setting includes:
based on the second rate, reading the second power level limit setting from a second map entry of the power limiting map.

9. A method as in claim 8, further comprising:
prior to imparting rotation to the induction motor to move the vehicle, loading the power limiting map having the multiple map entries into the memory, the power limiting map defining a function which correlates induction motor rotation rates to power limit percentages to adjust how much of a maximum current limit is imposed on the induction motor to protect control circuitry that controls the induction motor.

10. A method as in claim 7 wherein applying the first power level limit and applying the second power level limit involve controlling the induction motor in a power limiting mode in which a reduced upper current limit is imposed on the induction motor in accordance with the power limiting data in place of a maximum current limit; and
wherein the method further comprises:
receiving a service brake command in response to actuation of a service brake pedal of the vehicle, and
in response to the service brake command, transitioning from controlling the induction motor in the power limiting mode to controlling the induction motor in the non-power limiting mode in which the maximum current limit is imposed on the induction motor in place of the reduced upper current limit.

11. A method as in claim 7 wherein applying the first power level limit and applying the second power level limit involve controlling the induction motor in a power limiting mode in which a reduced upper current limit is imposed on the induction motor in accordance with the power limiting data in place of a maximum current limit; and wherein the method further comprises:
sensing that the forward/reverse switch is moved from the forward position to a reverse position, and
in response to sensing that the forward/reverse switch is moved from the forward position to the reverse position, transitioning from controlling the induction motor in the power limiting mode to controlling the induction motor in the non-power limiting mode in which the maximum current limit is imposed on the induction motor in place of the reduced upper current limit.

12. A method as in claim 7 wherein the vehicle is a golf car having a lithium battery;
wherein the induction motor is an alternating current (AC) motor that drives a set of tires of the golf car using power from the lithium battery;
wherein the regenerative braking slows the vehicle while preventing the set of tires from skidding while the golf car moves over a surface; and
wherein the regenerative braking further recharges the lithium battery of the golf car.

13. A vehicle, comprising:
a vehicle body;
a rechargeable battery supported by the vehicle body;
an induction motor supported by the utility vehicle body; and
control circuitry coupled with the rechargeable battery and the induction motor, the control circuitry being constructed and arranged to control regenerative braking to reduce skidding of the vehicle by:
imparting rotation to the induction motor to move the vehicle,
while the induction motor rotates at a first rate, applying a first power level limit for regenerative braking to the induction motor, and
while the induction motor rotates at a second rate, applying a second power level limit for regenerative braking to the induction motor, the second power level limit being less than the first power level limit, each of the first power level limit and the second power level limit imposing an upper limit to power available to the induction motor during regenerative braking;
wherein imparting rotation to the induction motor to move the vehicle includes:
sensing that a forward/reverse switch of the vehicle is set to a forward position,
sensing operation of an accelerator pedal of the vehicle, and
in response to sensing that the forward/reverse switch is set to the forward position and sensing operation of the accelerator pedal, driving the induction motor to move the vehicle in a forward direction;
wherein applying the first power level limit for regenerative braking to the induction motor includes:
sensing that the vehicle is moving in the forward direction,
ascertaining that the induction motor is currently rotating at the first rate, and
based on the vehicle moving in the forward direction and the induction motor currently rotating at the first rate, directing the induction motor to provide braking torque that slows the vehicle in accordance with the first power level limit.

14. A vehicle as in claim 13, further comprising:
computerized memory which stores power limiting data; and
wherein applying the first power level limit for regenerative braking to the induction motor includes:
accessing the power limiting data to identify a first power level limit setting, and
operating the induction motor in accordance with the first power level limit setting to provide braking torque that slows the vehicle.

15. A vehicle as in claim 14 wherein applying the second power level limit for regenerative braking to the induction motor includes:
accessing the power limiting data to identify a second power level limit setting which is different from the first power level limit setting, and
operating the induction motor in accordance with the second power level limit setting to provide braking torque that slows the vehicle.

16. Electronic apparatus to control regenerative braking to reduce skidding of a vehicle, the electronic apparatus comprising:
a battery interface constructed and arranged to couple with a rechargeable battery of the vehicle;
an induction motor interface constructed and arranged to couple with an induction motor of the vehicle; and
control circuitry coupled with the battery interface and the induction motor interface, the control circuitry being constructed and arranged to:
impart rotation to the induction motor to move the vehicle,
while the induction motor rotates at a first rate, apply a first power level limit for regenerative braking to the induction motor, and
while the induction motor rotates at a second rate, apply a second power level limit for regenerative braking to the induction motor, the second power level limit being less than the first power level limit, each of the first power level limit and the second power level limit imposing an upper limit to power available to the induction motor during regenerative braking
wherein imparting rotation to the induction motor to move the vehicle includes:
sensing that a forward/reverse switch of the vehicle is set to a forward position,
sensing operation of an accelerator pedal of the vehicle, and
in response to sensing that the forward/reverse switch is set to the forward position and sensing operation of the accelerator pedal, driving the induction motor to move the vehicle in a forward direction;
wherein applying the first power level limit for regenerative braking to the induction motor includes:
sensing that the vehicle is moving in the forward direction,
ascertaining that the induction motor is currently rotating at the first rate, and
based on the vehicle moving in the forward direction and the induction motor currently rotating at the first rate, directing the induction motor to provide braking torque that slows the vehicle in accordance with the first power level limit.

17. A method of controlling regenerative braking to reduce skidding of a vehicle, the method comprising:

imparting rotation to an alternating current (AC) electric motor to move the vehicle to a first commanded vehicle speed;

applying a regenerative braking power to the AC electric motor to bring the vehicle to a second commanded vehicle speed;

while applying the regenerative braking power, adjusting the level of regenerative braking power applied to follow a predetermined speed reduction rate;

while adjusting the level of regenerative braking power applied, provide a limit to the maximum level of regenerative braking power available; and while providing the limit to the maximum level of regenerative braking power available, adjusting the limit to the maximum level of regenerative braking power available based on a current speed of the vehicle;

wherein imparting rotation to the AC electric motor to move the vehicle includes:

sensing that a forward/reverse switch of the vehicle is set to a forward position, sensing operation of an accelerator pedal of the vehicle, and in response to sensing that the forward/reverse switch is set to the forward position and sensing operation of the accelerator pedal, driving the induction motor to move the vehicle in a forward direction;

wherein applying the regenerative braking power to the AC electric motor includes:

sensing that the vehicle is moving in the forward direction, ascertaining that the induction motor is currently rotating at the first rate, and based on the vehicle moving in the forward direction and the induction motor currently rotating at the first rate, directing the induction motor to provide braking torque that slows the vehicle in accordance with the first power level limit.

* * * * *